United States Patent [19]

Latvala et al.

[11] Patent Number: 4,651,851
[45] Date of Patent: Mar. 24, 1987

[54] ROTOR FOR A DISC BRAKE ASSEMBLY

[75] Inventors: Bruce E. Latvala, Grafton; Kurt R. Heidmann, Fairview Park, both of Ohio

[73] Assignee: Allied Corporation, Morristown, N.J.

[21] Appl. No.: 302,284

[22] Filed: Sep. 15, 1981

[51] Int. Cl.$^4$ .............................................. F16D 65/12
[52] U.S. Cl. .................. 188/218 XL; 188/264 AA; 192/107 R; 192/113 A
[58] Field of Search .... 188/218 XL, 264 A, 264 AA; 132/107 R, 113 A

[56] References Cited

U.S. PATENT DOCUMENTS

| 3,378,114 | 4/1968 | Hollins | 192/107 R X |
| 3,476,217 | 11/1969 | Knapp | 188/73.37 |
| 3,892,297 | 7/1975 | Brownyer | 188/218 XL |
| 3,941,221 | 3/1976 | Pringle | 188/218 XL |
| 4,202,560 | 5/1980 | Inbody | 280/96.3 |
| 4,226,304 | 10/1980 | Erdmann | 188/18 A |

FOREIGN PATENT DOCUMENTS

| 1950178 | 4/1971 | Fed. Rep. of Germany | 188/218 XL |
| 1206671 | 8/1959 | France | 188/218 XL |
| 1361251 | 4/1964 | France | 188/218 XL |
| 1478386 | 3/1967 | France | 188/218 XL |
| 1309093 | 10/1982 | France | 188/218 XL |
| 50471 | 4/1977 | Japan | 188/218 XL |
| 847120 | 9/1960 | United Kingdom | 188/218 XL |

Primary Examiner—George E. A. Halvosa
Attorney, Agent, or Firm—Ken C. Decker

[57] ABSTRACT

A rotor for a disc brake assembly is provided with a first portion (52) adapted for attachment to a wheel assembly (28), a second portion (54) engageable with at least a pair of friction elements and a connecting portion (56) extending between the first and second portions. The second portion (54) defines an inboard surface (60) and an outboard surface (64) facing the first portion (52). The connecting portion (56) cooperates with the second portion (54) to define a heat sink (78) at the radially inner edge of the inboard surface (60) to substantially offset tilting of the second portion toward the first portion in response to temperature expansion of the rotor second portion (54).

1 Claim, 3 Drawing Figures

ROTOR FOR A DISC BRAKE ASSEMBLY

This invention relates to a rotor for a disc brake assembly, and, more particularly, an offset rotor with a first portion secured to a wheel assembly and an axially offset second portion engageable with at least a pair of friction elements during braking. A connecting portion extends between the first portion and the second portion.

A disc brake assembly includes a caliper with an actuator which is operable during braking. The caliper and actuator cooperate with the pair of friction elements to bias the latter into engagement with the rotor second portion during braking. The pair of friction elements tightly engage the rotor second portion to retard rotation of the latter and a torque member prohibits rotation of the caliper assembly or the pair of friction elements with the rotor. The kinetic energy of the rotating wheel assembly and rotor is converted to thermal energy in the form of heat as the rotor second portion is heated to an increased temperature during braking. Consequently, the rotor second portion expands slightly radially during braking in response to the increase in temperature. However, the connecting portion remains at a lower temperature than the second portion so that its radial expansion is noticeably less than the second portion. As a result, the connecting portion opposes the radial expansion of the second portion, thereby causing the second portion to tilt away from a desired position in the direction of the first portion.

With an offset rotor, a connecting portion is provided to connect the first portion to the second portion. The rotor second portion is provided with an inboard surface facing the center of a vehicle and an outboard surface facing the first portion. The surfaces engage the pair of friction elements, respectively, during braking. When the rotor second portion is tilted slightly, the radially outer edge of the outboard surface is further stressed by one of the pair of friction elements and the radially inner edge of the inboard surface is further stressed by the other friction element. The stressing of the rotor at these areas increases the probability for cracking of the rotor.

In the alternative, the first portion may be closer to the inboard surface of the second portion than to the outboard surface.

In addition, the connecting portion extends from the rotor second portion adjacent the outboard surface at a radially inner edge so that heat is more readily conveyed away from the inner edge of the outboard surface resulting in lower temperatures in this area. Consequently, the inner edge of the outboard surface will expand radially to a lesser degree than for the remainder of the second portion to additionally tilt the rotor second portion.

Although the description which follows refers to a ventilated rotor, the invention herein is equally applicable to a solid rotor. It is an object of the present invention to design a rotor which will substantially overcome the foregoing problems of the rotor tilting in response to temperature increases in the rotor during braking.

To this end, the present invention provides a rotor for a disc brake assembly comprising a first portion adapted for attachment to a wheel assembly, a second portion axially offset from the first portion and adapted for absorbing thermal energy during braking to increase the temperature of the second portion and a connecting portion extending between the first and second portions, the second portion expanding in response to the increase in temperature and the connecting portion opposing the expansion to cause the second portion to tilt in a first direction away from a desired position, characterized in that said connecting portion is attached to said second portion to define a predetermined temperature gradient within said second portion during braking and said predetermined temperature gradient causes said second portion to tilt in a second direction substantially opposite to the first direction to substantially maintain said second portion in the desired position.

It is an advantage of the present invention that the temperature gradient for the rotor is changed during braking with only a slight modification of the attachment between the rotor second portion and the connecting portion. As a result, the rotor is substantially maintained in a desired position to avoid cracking of the rotor and improve lining wear for the pair of friction elements.

Figure 1:
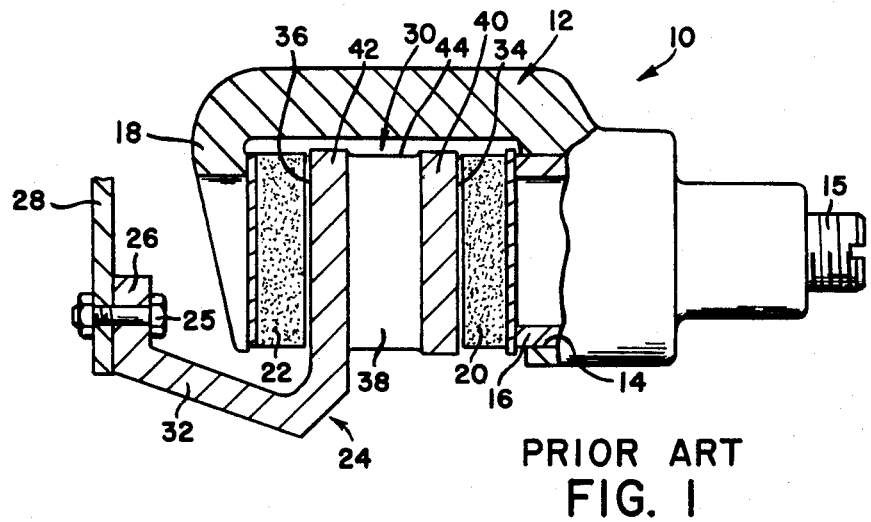
FIG. 1 shows a disc brake assembly and a rotor constructed in accordance with the teachings of the prior art.

A disc brake assembly 10 includes a caliper 12 with a bore 14 for receiving a piston 16. The bore 14 also receives an actuator, partially shown at 15, which is operable during braking to move the piston 16 outwardly from the bore 14. The caliper also includes a reaction arm 18 opposite from the piston 16. The caliper piston 16 and reaction arm 18 cooperate during braking to control movement of a pair of friction elements 20 and 22. A rotor 24 includes a first portion 26 adapted for attachment (via bolt 25) to a wheel assembly 28, a second portion 30 engageable with the pair of friction elements 20 and 22, and a connecting portion 32 extending between the first portion 26 and the second portion 30. The rotor second portion 30 defines an inboard surface 34 engageable with the friction element 20 and generally facing the center of a vehicle (not shown) away from the wheel assembly 28. An outboard surface 36 on the portion 30 is engageable with the friction element 22 and faces the first portion 26. The portion 30 is further ventilated to form a plurality of air passages 38 separating an inboard rim 40 from an outboard rim 42. A plurality of vanes 44 connect the inboard rim 40 to the outboard rim 42. The connecting portion 32 extends integrally from the outboard rim 42 to the first portion 26.

Figure 2:
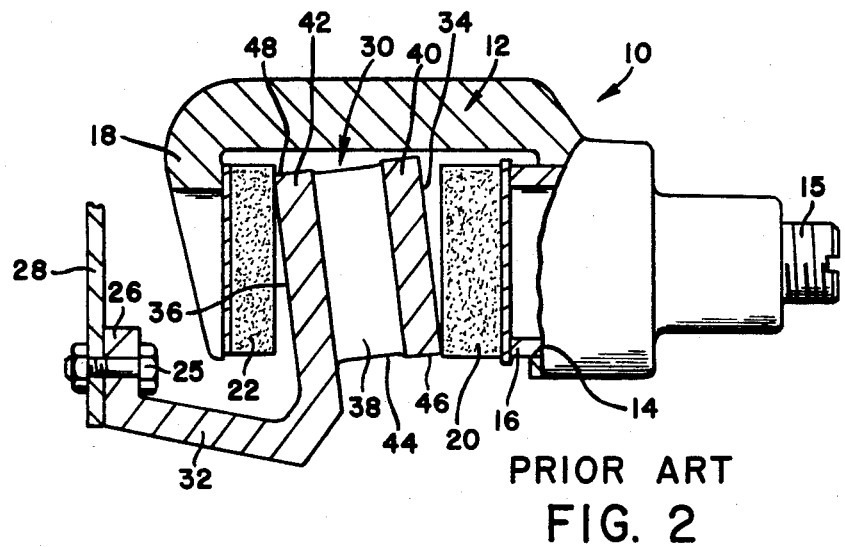
FIG. 2 shows the disc brake assembly and rotor of FIG. 1 during a brake application, albeit in an exaggerated position.

Turning to FIG. 2, when the actuator 15 is operated, the piston 16 moves to the left to directly engage the friction element 20 with the inboard surface 34. Next, the caliper 12 moves to the right to indirectly engage the friction element 22 with the outboard surface 36. Consequently, in a manner well known in the art, to rotor 24 and wheel assembly 28 are either prevented from rotating or, if already rotating, retarded from increasing speeds, or slowed to a stop during braking.

During braking, the kinetic energy of the wheel assembly 28, rotor 24 and the vehicle (not shown) are converted to thermal energy which increases the temperature of the rotor 24, and, in particular, the rotor second portion 30. With the connecting portion 32 and the first portion 26 remaining spaced from the pair of friction elements 20 and 22, these portions are maintained at a substantially lower temperature than the second portion 30. The rotor material includes a coefficient of thermal expansion, so that substantially increasing temperatures for the second portion 30 causes the latter to expand radially. This radial expansion is opposed by the cooler connecting portion 32 so that the second portion 30 tends to tilt in the direction of the first portion 26. This tilting is sometimes referred to as rotor "tipping" or "coning". With the rotor in its tilted position, the radially inner edge 46 of the inboard surface 34 is stressed by its engagement with the friction element 20 and the radially outer edge 48 of the outboard surface 36 is stressed by its engagement with the friction element 22. Consequently, these stressed areas are more likely to crack during braking when the rotor is tilted.

The tilting of the rotor portion 30 is further compounded by the connecting portion 32 which integrally extends from the outboard rim 42. Consequently, the connecting portion 32 acts as a heat sink to convey thermal energy to the connecting portion so that the radially inner edge of the outboard rim is further cooled to increase the temperature differential between the inner edges of the rims.

Figure 3:
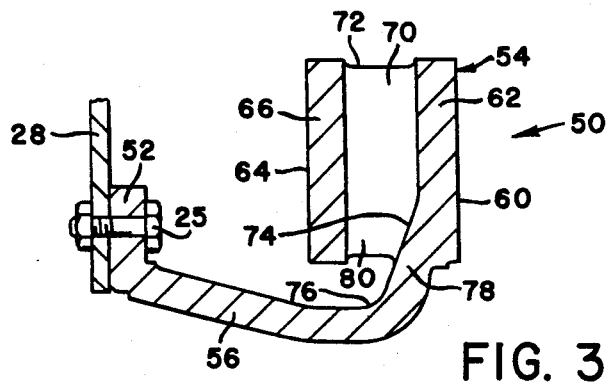
FIG. 3 shows a rotor constructed in accordance with the present invention.

In accordance with the invention, a rotor 50, see FIG. 3, is provided for a disc brake assembly, such as described and shown in FIGS. 1 and 2. The rotor 50 is similar to the rotor 30 in that a first portion 52 is adapted for attachment to the wheel assembly 28, a second portion 54 is engageable with the pair of friction elements 20 and 22, and a connecting portion 56 extends between the first portion 52 and the second portion 54. Also, the rotor 50 includes an inboard surface 60 for the inboard rim 62 and an outboard surface 64 for the outboard rim 66. A plurality of passages 70 provide for air flow within the second portion 54 and a plurality of vanes 72 connect the outboard rim 66 with the inboard rim 62.

The rotor 50 differs from the rotor 30 in that the connecting portion 56 extends from the inboard rim 62 and the inboard rim 62 includes an inner tapered wall 74 contiguous with an arcuate portion 76 of the connecting portion 56. The tapered wall 74 and the connecting portion 56 define a heat sink 78 at the radially inner edge of the inboard rim 62 to assist the transfer of thermal energy from the inboard rim to the connecting portion 56. The plurality of passages 70 terminate in an inner opening 80 so that air exiting the opening 80 will be directed by the tapered wall 74 and the arcuate portion 76 axially outward in the direction of the first portion 52 and its associated wheel assembly.

During braking, the rotor second portion 54 will heat up with corresponding increases in temperature. As a result, the second portion will expand against the restraint of the cooler connecting portion 56 so that the second portion will tend to pivot or tilt toward the first portion 52. However, any increase in temperature for the inboard rim 62 will be substantially reduced at the radially inner edge by the heat sink 78 which conveys heat from the rim 62 to the connecting portion 56 to dissipate heat into the environment surrounding the connection portion. Therefore, at the same time the second portion 54 is tilted toward the first portion 52 in response to heat expansion and the resistance of the connecting portion 56, the cooler heat sink 78 is expanding to a lesser degree than the remainder of the second portion so that the latter is also tilted away from the first portion 52 about the heat sink 78. As a result, the second portion is permitted to expand radially but is substantially retained at a normal direction to the axis of the rotor.

There are many variations to the present invention and, as such, these variations are covered by the appended claims.

We claim:

1. A rotor for a disc brake assembly comprising a first portion adapted for attachment to or, in the alternative, integrally formed with a wheel assembly, said wheel assembly being rotatable about an axis, a second portion axially offset from the first portion and adapted for absorbing thermal energy during braking which increases the temperature of the second portion, and a connecting portion extending between the first and second portions, the second portion expanding in response to the increase in temperature and the connecting portion opposing the expansion to cause the second portion to tilt in a first direction toward the first portion away from a desired position, said connecting portion being attached to said second portion to define a predetermined temperature gradient within said second portion during braking and said predetermined temperature gradient causes said second portion to tilt in a second direction substantially opposite to the first direction to substantially maintain said second portion in the desired position, said second portion including an inboard surface remote from said first portion and an outboard surface facing said first portion and said connecting portion extending substantially from said inboard surface, said outboard surface defining a radially inner edge and said connecting portion extending past said radially inner edge in spaced relation thereto, said second portion defining a plurality of passages providing for air flow therethrough and said connecting portion including an arcuate portion directing the air flow toward said first portion, said second portion defining a circumferentially extending tapered wall forming a contiguous surface with said arcuate portion, said tapered wall cooperating with said inboard surface to define a larger axial thickness on one side of said plurality of passages at a radially inner edge of said inboard surface.

* * * * *